R. BARRETT.
VEHICLE.
APPLICATION FILED JUNE 30, 1919.

1,343,993.

Patented June 22, 1920.
2 SHEETS—SHEET 1.

INVENTOR.
Ray Barrett
BY
Davis & Simms
his ATTORNEYS.

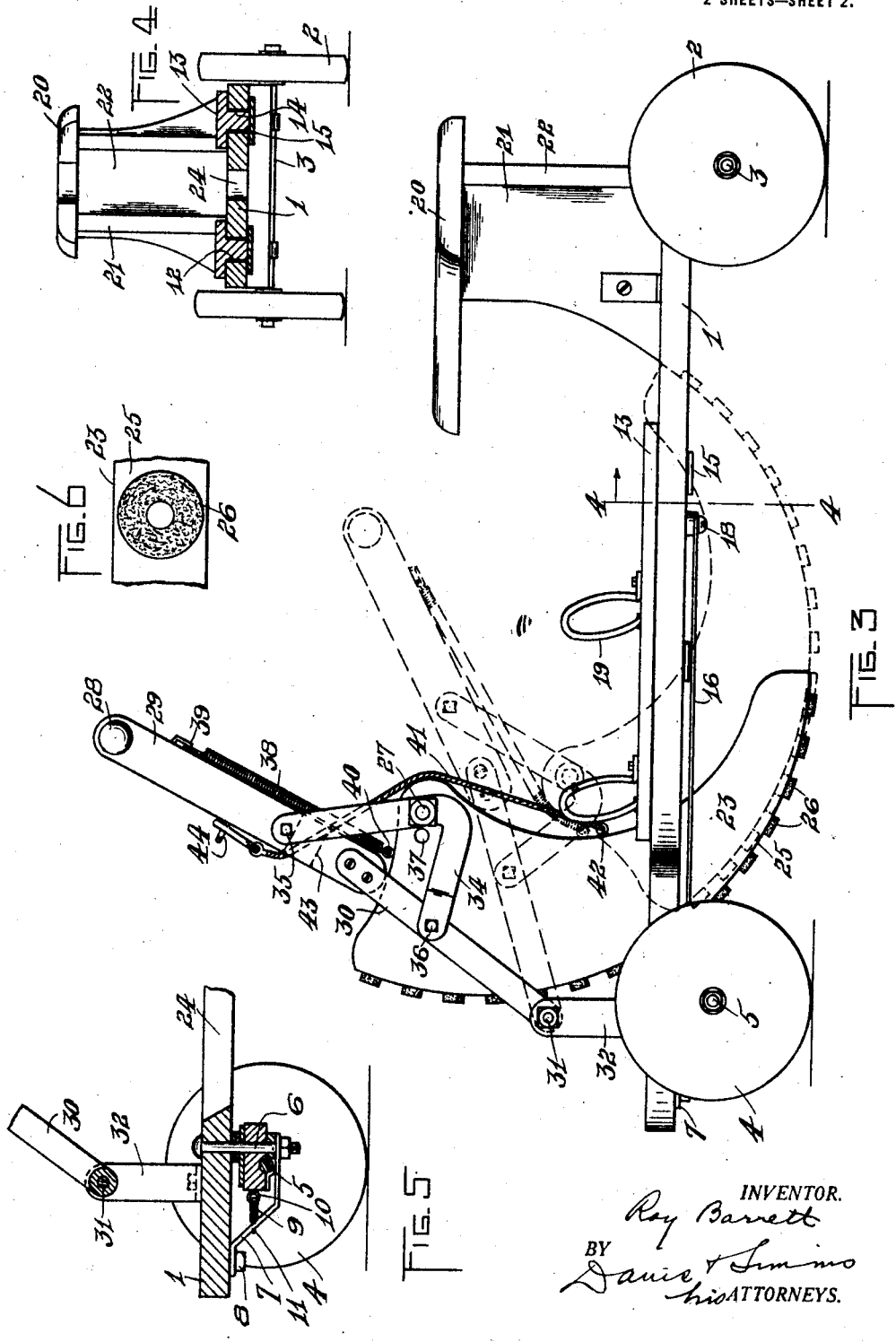

UNITED STATES PATENT OFFICE.

ROY BARRETT, OF PALMYRA, NEW YORK.

VEHICLE.

1,343,993.   Specification of Letters Patent.   Patented June 22, 1920.

Application filed June 30, 1919. Serial No. 307,599.

*To all whom it may concern:*

Be it known that I, ROY BARRETT, a citizen of the United States, and resident of Palmyra, in the county of Wayne and State of New York, have invented certain new and useful Improvements in Vehicles, of which the following is a specification.

The present invention relates to vehicles and more particularly to the type in which a pusher or propeller is movably mounted upon the vehicle and engages with the surface over which the vehicle travels for the purpose of moving said vehicle, an object of this invention being to provide a pusher or propeller of novel construction having a maximum amount of power while at the same time being easy to operate. Another object of the invention is to provide a steering mechanism under the control of the feet of a user of the vehicle, said steering mechanism being adapted for children of different sizes.

To these and other ends, the invention consists of certain parts and combinations of parts, all of which will be hereinafter described, the novel features being pointed out in the appended claims.

In the drawings:

Fig. 3 is a side view of a vehicle;

Fig. 4 is a section on the line 4—4, Fig. 3;

Fig. 5 is a vertical sectional view through the steering axle; and

Fig. 6 is a detail view.

Figure 1:
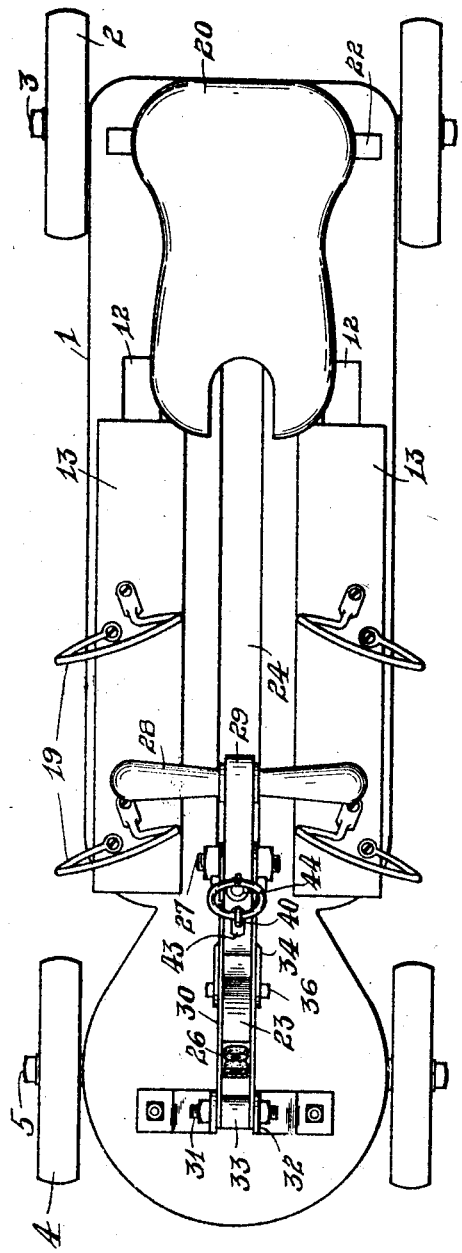
Figure 1 is a plan view of a vehicle embodying the present invention.
Figure 2:
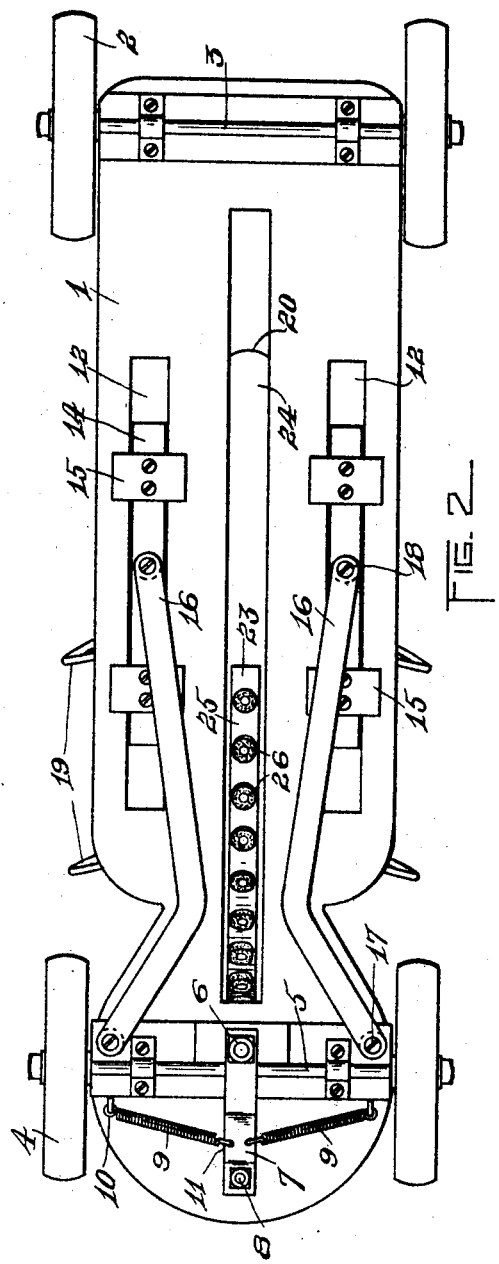
Fig. 2 is a bottom view of the vehicle shown in Fig. 1.

Referring more particularly to the drawings, 1 indicates the body board of the body and 2 indicates the rear wheels supported by an axle 3 secured to the under side of the body board. The body board may be supported by front wheels 4 arranged on an axle 5 mounted to swing on a bolt 6, the lower end of the bolt being supported by a strap 7 which is secured to the bolt and is also secured at 8 to the under side of the body board. With the purpose in view of holding the wheels in their central positions, two coil springs 9 may be provided, each anchored at 10 to the axle and at 11 to the strap 7.

The steering of the vehicle may be effected in any suitable manner. In this instance, the body board is provided with two longitudinally extending slots 12 while supported on the top surface of the body board are two slides 13 having guide ribs 14 on the under sides depending into the slots 12. Securing plates 15 may be secured to the guide portions 14 to overlap the under sides of the body board for the purpose of holding the slides 13 to the body board. Connection between the slides 13 and the steering axle 5 is preferably established by two links 16, each of these links being arranged on the under side of the body board, pivotally connected at 17 to the axle and pivotally connected at 18 to the guide portions 14 of the slides 13. On the upper sides of each of the slides 13 a plurality of foot rests 19 are preferably provided, these foot rests being arranged at different distances from a seat 20 which is supported at the rear of the body board 1 by two spaced uprights 21 connected at their rears by a plate 22.

The propelling of the vehicle is preferably effected through a pusher 23. This pusher operates in a slot 24 extending longitudinally of the vehicle between the two slides 13 and is preferably in the form of a member having an engaging surface 25 formed in the arc of a circle and in this instance provided with a plurality of projections 26 made of canvas or other anti-slipping material. This pusher is pivotally supported on a movable member, one form of which will be hereafter described, to swing about an axis 27, this axis being eccentric to the arc of the curved face 25.

The movable member that supports and operates the pusher is in this instance in the form of a lever comprising a handle portion 28 on an outer portion 29 which is secured to an inner portion 30 formed by two links pivoted at 31 to two uprights 32, a spacer 33 being provided between the links. Also forming part of the lever are two angularly formed brackets 34 secured at their opposite ends at 35 and 36 respectively, to the portion 29 and the links 30 and acting to support the pivot 27 of the pusher. The pusher is preferably provided with one or more other openings 37 through which the pivot pin 27 may be introduced for the purpose of varying the leverage of the pusher. A spring 38, anchored at 39 to the portion 29 and at 40 to the pusher, serves normally to bring the wide end of the pusher between the links 30 and into abutment with the lower end of the portion 29, this position being assumed whenever the movable member or lever which supports the pusher is thrown to its uppermost position as shown in Fig. 3 of the drawings. For holding the pusher against the action of the spring so that the pusher may be held in an elevated position for coasting, a flexible connection 41 is connected at 42 to the pusher and extends upwardly from the pusher through an opening 43 in the lever 29 and is adapted to be anchored to a hook 44 on the lever.

In using the vehicle the latter is preferably steered by the feet which are brought into engagement with the desired pair of foot rests 19 on the slides 13 and the vehicle is turned through these slides. Normally the wheels are held in their central position by the springs 9. To propel the vehicle, the lever or movable member is thrown to its uppermost position, when the spring 38 will move the pusher to the position shown in Fig. 3. The lever is then pulled downwardly and in doing so the pusher rolls in contact with the ground or surface on which the vehicle is traveling. The handle or lever is vibrated back and forth quickly, the pusher each time rolling in contact with the ground and being returned to its starting position by the spring 38.

From the foregoing it will be seen that there has been provided a steering mechanism which is under the control of the feet of the user and is adapted for children of different sizes. The propelling means acts in a manner similar to a wheel in rolling, frictionally engaging the ground while pressure is applied thereto and returning to a normal position. This propelling means has its engaging surface curved on an arc of a circle and is pivotally supported on a movable member at a point eccentric to the curve of said arc.

What I claim as my invention and desire to secure by Letters Patent is:

1. In a vehicle, a propelling means comprising a movable operating member, a pusher having a ground engaging portion curved on an arc of a circle and pivotally mounted on the movable member, its pivot being eccentric to the curve of the ground engaging portion, and yielding means acting on said pusher.

2. In a vehicle, a seat, a lever pivotally supported in advance of the seat and operable from said seat, a pusher pivotally connected to said lever and having a ground engaging portion curved on an arc of a circle, the pivot of the pusher being eccentric to the curve, and a spring connecting said lever and pusher.

3. In a vehicle, a body board provided with a longitudinally extending slot, a seat in rear of said slot, a lever pivotally supported at the forward end of the slot and operable from the seat, and a pusher arranged to operate in said slot pivotally mounted on said lever and having a curved ground engaging portion to roll on the ground, the pivot of the pusher being eccentric with reference to said curved ground engaging portion.

4. In a vehicle, a seat, a lever pivotally mounted in advance of the seat and having two spaced parts adjacent its pivot, a pusher pivotally mounted on the lever and adapted to operate between the spaced parts, and a spring acting on the pusher to hold it between the spaced parts.

5. In a vehicle, a body board provided with a longitudinally extending slot, a seat arranged in the rear of the slot, a lever pivoted at the forward end of the slot and having two spaced parts, a pusher pivotally mounted on the lever and having a ground engaging portion curved in an arc of a circle, the pivot of the pusher being eccentric to said curve, and a spring acting on said pusher and arranged to hold it between the spaced parts of the lever.

ROY BARRETT.